United States Patent [19]

Guenther

[11] 4,013,057
[45] Mar. 22, 1977

[54] PISTON ASSEMBLY

[75] Inventor: William D. Guenther, Hagerstown, Ind.

[73] Assignee: Dana Corporation, Toledo, Ohio

[22] Filed: May 14, 1975

[21] Appl. No.: 577,562

[52] U.S. Cl. .............................. 123/193 P; 92/187; 92/190; 403/152

[51] Int. Cl.² .......................................... F02F 3/00

[58] Field of Search .................. 403/150, 152, 154; 123/193 P, 193 CP; 92/187, 189, 190, 216

[56] References Cited

UNITED STATES PATENTS

| 1,795,353 | 3/1931 | Taylor et al. | 92/238 |
| 3,789,743 | 2/1974 | Sihon | 92/187 |

FOREIGN PATENTS OR APPLICATIONS

| 496,623 | 12/1938 | United Kingdom | 92/190 |

Primary Examiner—Charles J. Myhre
Assistant Examiner—William C. Anderson
Attorney, Agent, or Firm—Oliver E. Todd, Jr.; Robert E. Pollock

[57] ABSTRACT

An improved piston assembly for high-power internal combustion engines such as supercharged diesel engines. The piston includes separate head and skirt portions. An elongated tubular-shaped bearing member having an internal bearing surface and an external journal surface is formed across the bottom of the piston head. A connecting rod passes through an opening in the lower center of the bearing member and is attached to a wrist pin which rotates against the internal bearing surface of the tubular-shaped bearing member to permit rotational movement between the connecting rod and the piston head. The wrist pin is supported by the bearing surface along its entire length to prevent any flexing of the wrist pin when high compressive forces are applied to the piston head. The skirt is connected to the piston head by thrust bearings which engage the external journal surface of the bearing member substantially along its entire length to permit rotational movement between the piston head and the piston skirt.

4 Claims, 6 Drawing Figures

PISTON ASSEMBLY

BACKGROUND OF THE INVENTION

This invention relates to pistons for internal combustion engines and more particularly to an improved construction for a piston having separate head and skirt portions.

In some internal combustion engines, it is desirable to use pistons having a skirt portion which is separate from, and rotatable with respect to, a head portion. A connecting rod is attached in a conventional manner to a wrist pin within the piston. The piston head is then attached to the wrist pin on either side of the connecting rod to permit rotational movement between the connecting rod and the piston head. The ends of the wrist pin engage bushing or bearing surfaces on the skirt to also permit rotational movement between the skirt, the head and the connecting rod. A piston of this type has several advantages over a piston having integral head and skirt portions. Side thrust exerted by the connecting rod on the piston is applied only to the skirt. Elimination of side thrust on the piston head reduces rocking action of the head caused by side thrust. This in turn reduces oil consumption and also reduces noise and wear. Since the piston head is separate from the skirt, heat is not transferred by conduction from the head to the skirt. Therefore, the separate skirt operates at a lower temperature than a skirt which is integral with a piston head. The lower skirt temperature permits closer tolerances between the piston skirt and an engine cylinder, which also reduces noise.

Pistons of the above-described construction having a separate head and skirt are sometimes used in high-power diesel engines. The output of a diesel engine can be greatly increased through the use of a supercharger. However, supercharged diesel engines stress conventional pistons to their design limit due to increased combustion pressure and a consequent heat buildup in the piston. Under these conditions, the wrist pin tends to deflect or bend. In extreme cases, deflection of the wrist pin will result in a cracked piston and particularly in a cracked piston skirt.

SUMMARY OF THE INVENTION

According to the present invention, an improved construction is provided for a piston having separate head and skirt portions. The improved construction eliminates flexing of the wrist pin under extreme load conditions and therefore eliminates a possible source of damage to the piston. A tubular-shaped bearing member extends most of the distance across the bottom of the piston head. The bearing member has an interior bearing surface which receives the wrist pin. The connecting rod passes through an opening in the lower center of the tubular member and is attached to the wrist pin. The wrist pin and the internal bearing surface of the bearing member cooperate to permit rotational movement between the connecting rod and piston head. The bearing surface engages the surface of the wrist pin at all points, except for a relatively small area adjacent the connecting rod opening, to prevent flexing of the wrist pin when extreme loads are applied to the piston head. The piston skirt is attached to the piston head by means of a thrust bearing which may be in the form of inserts or integrally formed in the skirt. The exterior surface of the bearing member forms a journal within the thrust bearing to permit rotational movement between the piston skirt and the piston head. The thrust bearing engages the sides of the bearing member substantially along its entire length to prevent any sideways flexing or bending of the wrist pin or of the bearing member from connecting rod side thrust under heavy load conditions.

In the illustrated and perferred embodiments the piston is oil-cooled by pumping oil through passages in the connecting rod, the wrist pin and the piston head and then spraying the oil against the bottom of the piston head. In addition, the connecting rod will also conduct a greater amount of heat from the piston head than in prior art pistons because of the increased load contact area between the piston head and the wrist pin.

Accordingly, it is an object of the invention to provide an improved piston for an internal combustion engine.

Another object of the invention is to provide an improved construction for a piston having separate head and skirt sections.

Still another object of the invention is to eliminate wrist pin deflection in a piston having separate head and skirt sections.

Other objects and advantages of the invention will become apparent from the following detailed description, with reference being made to the accompanying drawings.

DESCRIPTION OF THE PREFERRED EMBODIMENTS

Figure 1:
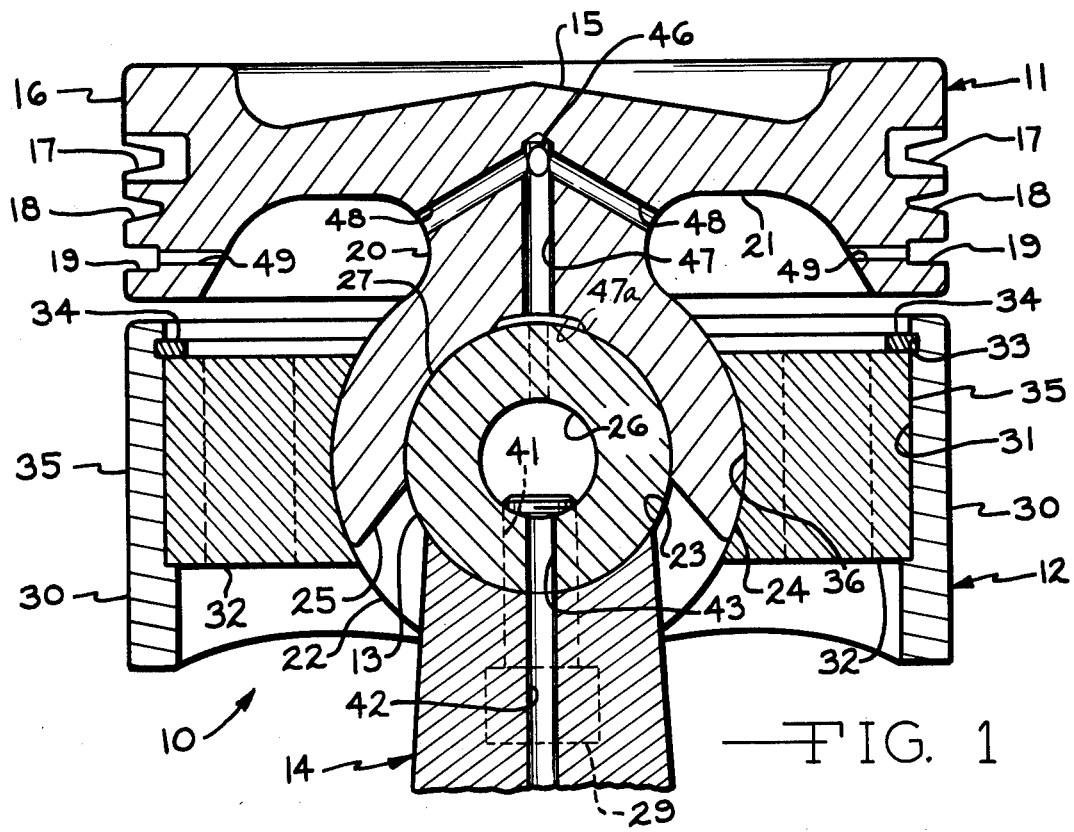
FIG. 1 is a fragmentary vertical cross section taken through a piston, a wrist pin and a connecting rod constructed in accordance with a first embodiment of the present invention.

Turning now to the drawings and particularly to FIGS. 1–4, a piston assembly 10 is shown according to a first embodiment of the present invention. The piston assembly 10 generally includes a piston head 11, a separate piston skirt 12, a wrist pin 13 and a connecting rod 14 (shown in fragmentary). The piston head 11 and the piston skirt 12 are attached to the wrist pin 13 in a novel manner which permits rotational movement between the head 11 and the skirt 12 and also between the head 11 and the connecting rod 14. The piston head 11, the piston skirt 12 and the wrist pin 13 are interconnected in a manner to prevent any flexing of the wrist pin 13 under extreme load conditions, as when the piston assembly 10 is operated in a supercharged internal combustion engine.

Figure 2:
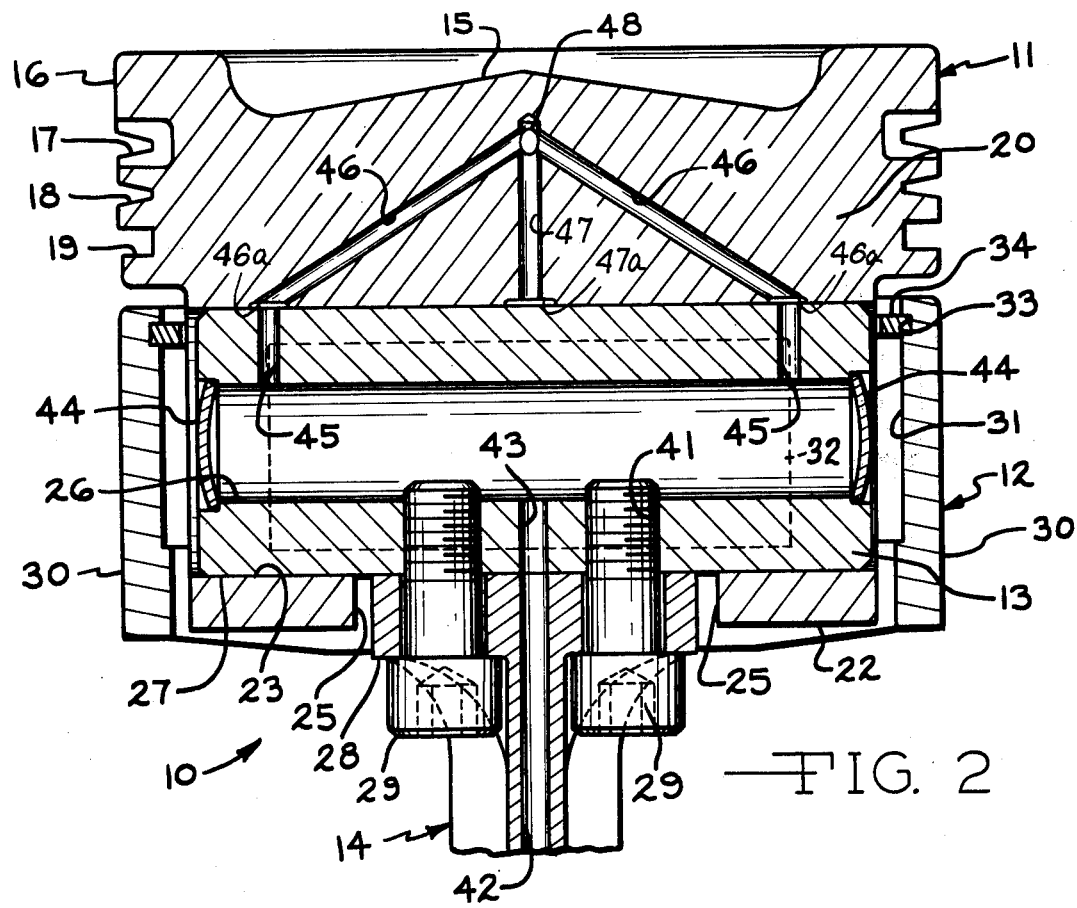
FIG. 2 is a fragmentary vertical cross-sectional view of a piston, wrist pin and connecting rod according to the first embodiment of the present invention and rotated 90° from the cross-sectional view of FIG. 1.

The piston head 11 is formed from a single casting of a suitable metal or metal alloy. The piston head 11 has a crown 15 which is shaped to form one wall of an expansion chamber, such as a combustion chamber (not shown) in an internal combustion engine, to provide desired operating characteristics. Around a periphery 16 of the head 11, three circumferential grooves 17, 18 and 19 are provided for receiving conventional piston ring seals (not shown), with the two uppermost grooves 17 and 18 receiving compression rings and the groove 19 receiving an oil ring. A webbed support structure 20 extends below the piston head 11 across the center of an inner piston crown 21. A generally tubular-shaped bearing member 22 is formed below the webbed support structure 20. As best seen in FIG. 2, the webbed support structure 20 and the tubular bearing member 22 extend substantially across the width of the piston head 11, leaving room only to receive over the member 22 the piston skirt 12 which has the same exterior diameter as the piston head 11. The tubular bearing member 22 has an interior bearing surface 23 and a concentric exterior journal surface 24. An opening 25 is provided through the tubular bearing member 22 adjacent its lower center for passing the connecting rod 14 and permitting rotational movement thereof with respect to the head 11.

The wrist pin 13 is in the general form of a tube having an interior opening 26 and an exterior journal surface 27. The wrist pin 13 is of a diameter such that the external journal surface 27 cooperates with the interior bearing surface 23 of the tubular bearing member 22 to permit rotational movement of the wrist pin 13 within the tubular bearing member 22. The connecting rod 14 includes an upper flanged end 28 which is located within the bearing member opening 25 and is attached to the wrist pin 13 by means of a pair of bolts 29. The wrist pin 13 is preferably slightly shorter in length than the tubular bearing member 22 and some clearance is provided between the connecting rod flange 28 and the opening 25 to permit a slight amount of axial movement of the wrist pin 13 within the tubular bearing member 22 for aligning the connecting rod 14 with a crankshaft within the internal combustion engine in which the piston assembly 10 is operated.

The skirt 12 has a tubular shape with an exterior surface 30 which is machined to closely engage the walls of a cylinder within an internal combustion engine. An annular step 31 is formed within the interior of the skirt 12 for receiving a pair of thrust bearing inserts 32 which attach the skirt 12 to the piston head 11. An annular groove 33 is machined within the step 31 for receiving a retaining ring 34 which holds the thrust bearing inserts 32 within the piston skirt 12.

Figure 3:
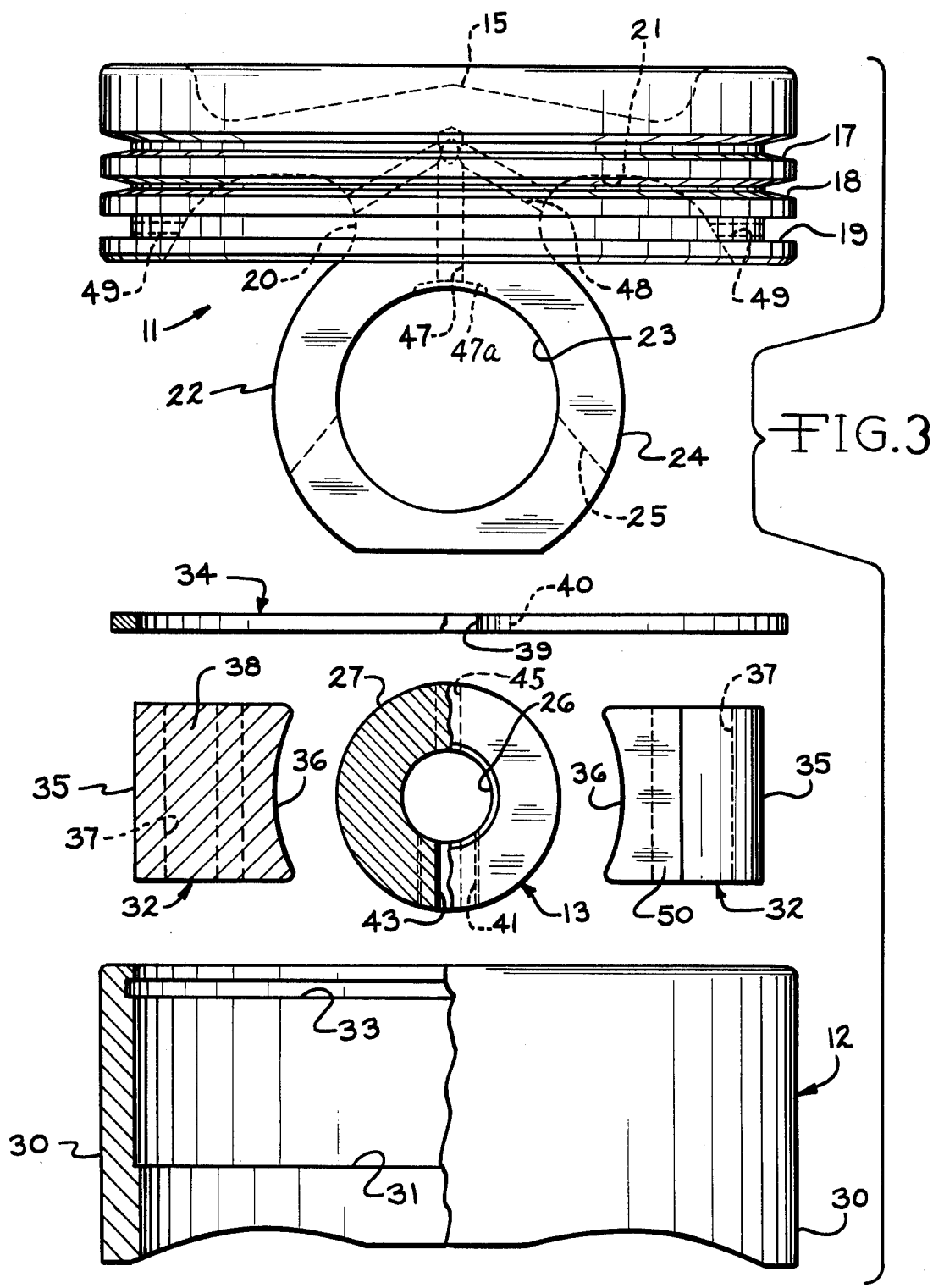
FIG. 3 is an exploded side elevational view, in partial section, of a piston and wrist pin constructed in accordance with the first embodiment of the present invention.
Figure 4:
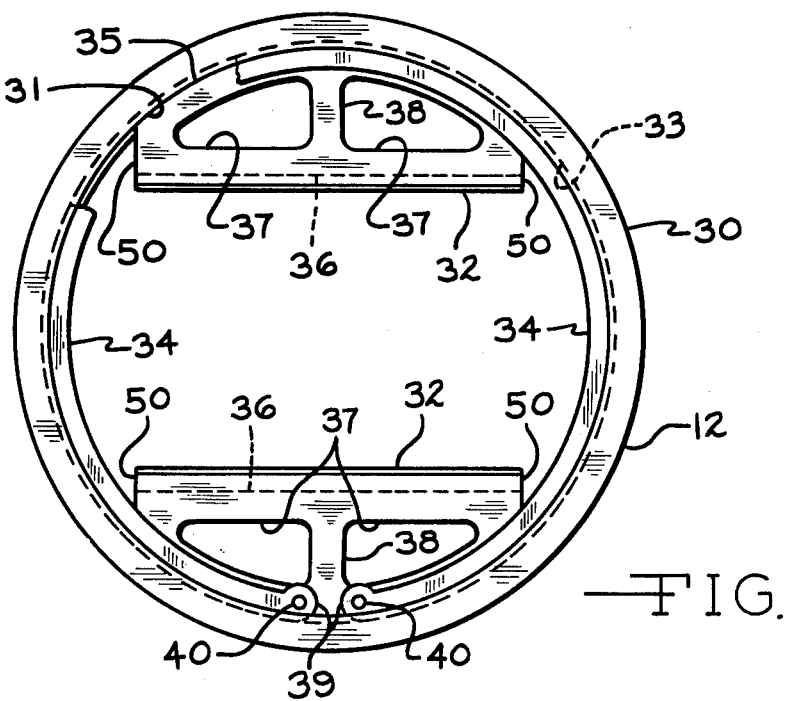
FIG. 4 is a top elevational view of a piston skirt with thrust bearing inserts and a partially broken away retainer ring constructed in accordance with the first embodiment of the present invention.

As best seen in FIGS. 3 and 4, the thrust bearing inserts 32 include an exterior surface 35 which is curved to closely engage the step 31 formed in the interior wall of the skirt 12. The thrust bearing inserts 32 also include an interior bearing surface 36 which is shaped to cooperate with the external journal surface 24 of the tubular bearing member 22 to permit rotational movement between the piston skirt 12 and the piston head 11. Each of the thrust bearing inserts 32 also includes two axial openings 37 which are spaced between the surfaces 35 and 36 and separated by a reinforcing webbing 38 to reduce their weight and to provide channels for cooling oil to flow through.

The retaining ring 34 is in the form of a split ring having a normal diameter greater than the diameter of the groove 31 formed within the piston skirt 12. The retaining ring 34 has a pair of spaced ends 39, each of which has an opening 40 therethrough for receiving a tool for compressing the ring 34 during assembly. When the thrust bearing inserts 32 are located within the skirt groove 31 and the retaining ring 34 is placed within the skirt groove 33, the thrust bearing inserts 32 are prohibited from moving within the tubular skirt 12.

The piston assembly 10 is assembled by initially placing the piston head 11 upside down on a work surface with the tubular bearing member 22 facing up. The wrist pin 13 is then slipped axially into the tubular bearing member 22 and threaded holes 41 for receiving the bolts 29 are aligned with the opening 25. The skirt retainer ring 34 is then laid on the piston around the tubular bearing member 22. Next, the thrust bearing inserts 32 are located with their interior bearing surfaces 36 against opposite sides of the exterior journal surface 24 on the tubular bearing member 22. The skirt 12 is then slipped over the assembly so that the thrust bearing inserts 32 enter the step 31. A tool is inserted through one of the openings 37 in the thrust bearing inserts 32 for engaging the openings 40 in the retaining ring ends 39. The tool, such as needlenose plyers, is then operated to compress the retaining ring 34 to permit sliding the retaining ring 34 into the groove 33. Finally, the connecting rod 14 is attached to the wrist pin 13 by passing the bolts 29 through the flange 28 and screwing the bolts 29 into the threaded wrist pin holes 41. This completes assembly of the piston assembly 10.

In operation, the engine crank will cause the connecting rod 14 to rotate back and forth or to oscillate about the axis of the wrist pin 13 as the piston assembly 10 is moved up and down within an engine cylinder. All vertical force components during the compression and combustion strokes are applied to the piston head 11, while side thrust components of the force are applied through the thrust bearing inserts 32 to the piston skirt 12 since the piston head 11 and the piston skirt 12 are free to rotate with respect to each other. Since side thrust components of the force are not applied to the piston head 11, the piston head 11 will move in a linear direction and will not tend to rock. Therefore, there will be a reduction in oil consumption and in noise.

Provision is made for supplying lubricating and cooling oil to the piston assembly 10. Oil is supplied under pressure through the engine crank to a passage 42 extending up the connecting rod 14. The passage 42 is connected through a radial passage 43 in the wrist pin 13 to the interior wrist pin opening 26. Ends of the wrist pin opening 26 are closed by means of caps 44. From the interior wrist pin opening 26, oil flows upwardly through a pair of radial passages 45 in the wrist pin 13 to passages 46 within the piston head 11. The passages 46 connect to a passage 47 within the piston head 11 for lubricating the wrist pin 13 and to a pair of passages 48 which are directed to spray oil within the interior piston crown 21. The passages 46 and 47 terminate in circumferential groove segments 46a and 47a, respectively, defined on interior bearing surface 23 which assure continuous communication between the associated passages in the risk pin 13 and head 11 as the former rotates with respect to the latter. A portion of the oil sprayed from the passages 48 enters passages 49 which lead radially through the piston head 11 to the oil ring within the ring groove 19 for lubricating the engine cylinder walls. The remaining oil flows over the inner piston crown 21 for cooling the piston head 11. From the inner piston crown 21, the oil flows downwardly through the openings 37 in the thrust bearing inserts 32 and around ends 50 of the thrust bearing inserts 32 and back to an engine oil sump. From the oil sump, the engine pumps the oil through a cooler and back through the passages in the piston assembly 11 and to other areas to be lubricated within the engine. Cooling of the piston head 11 is also increased by the increased contact between the tubular bearing member 22 and the wrist pin 13 which facilitates heat conduction from the piston head 11 to the cooler connecting rod 14.

Figure 5:
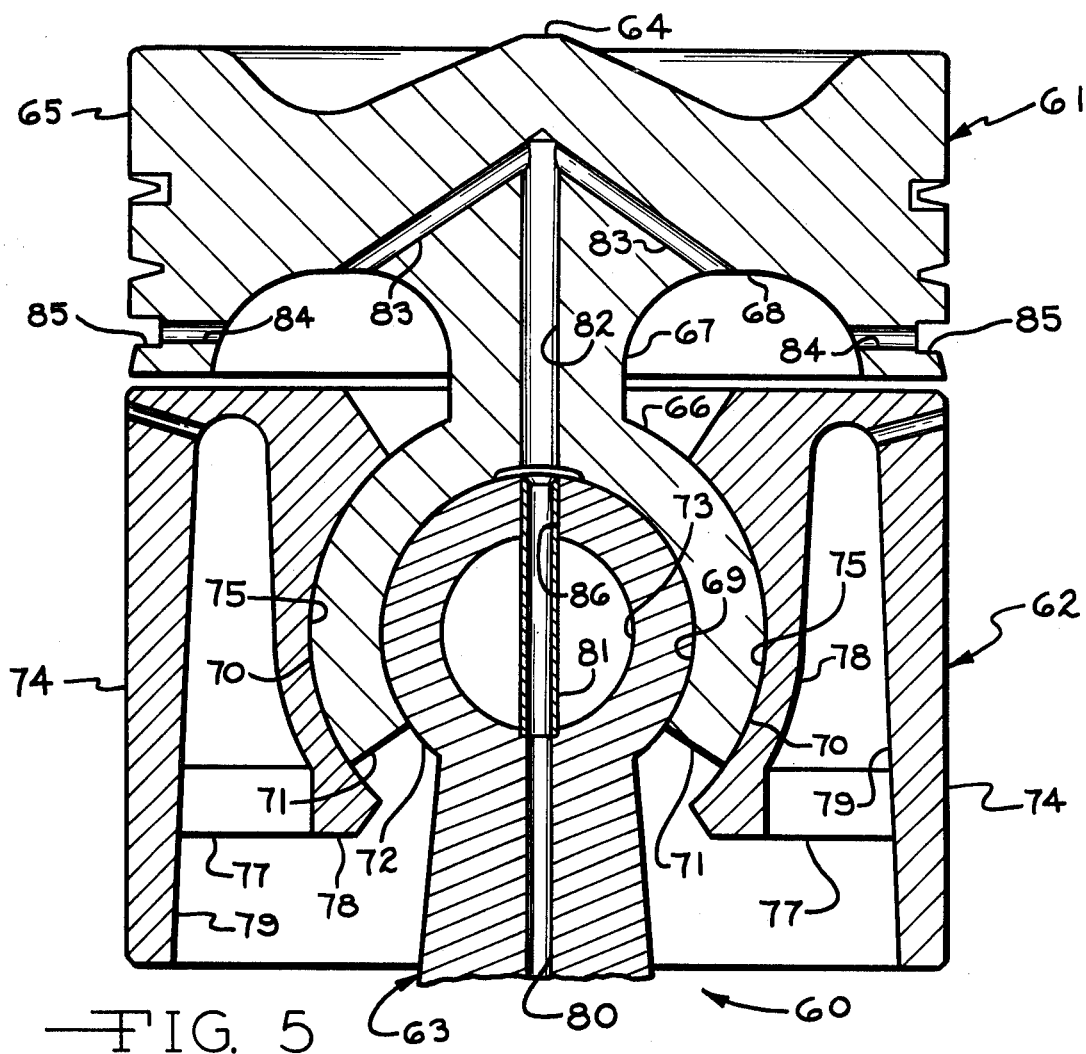
FIG. 5 is a fragmentary vertical cross-sectional view of a piston and connecting rod constructed in accordance with a modified embodiment of the present invention.
Figure 6:
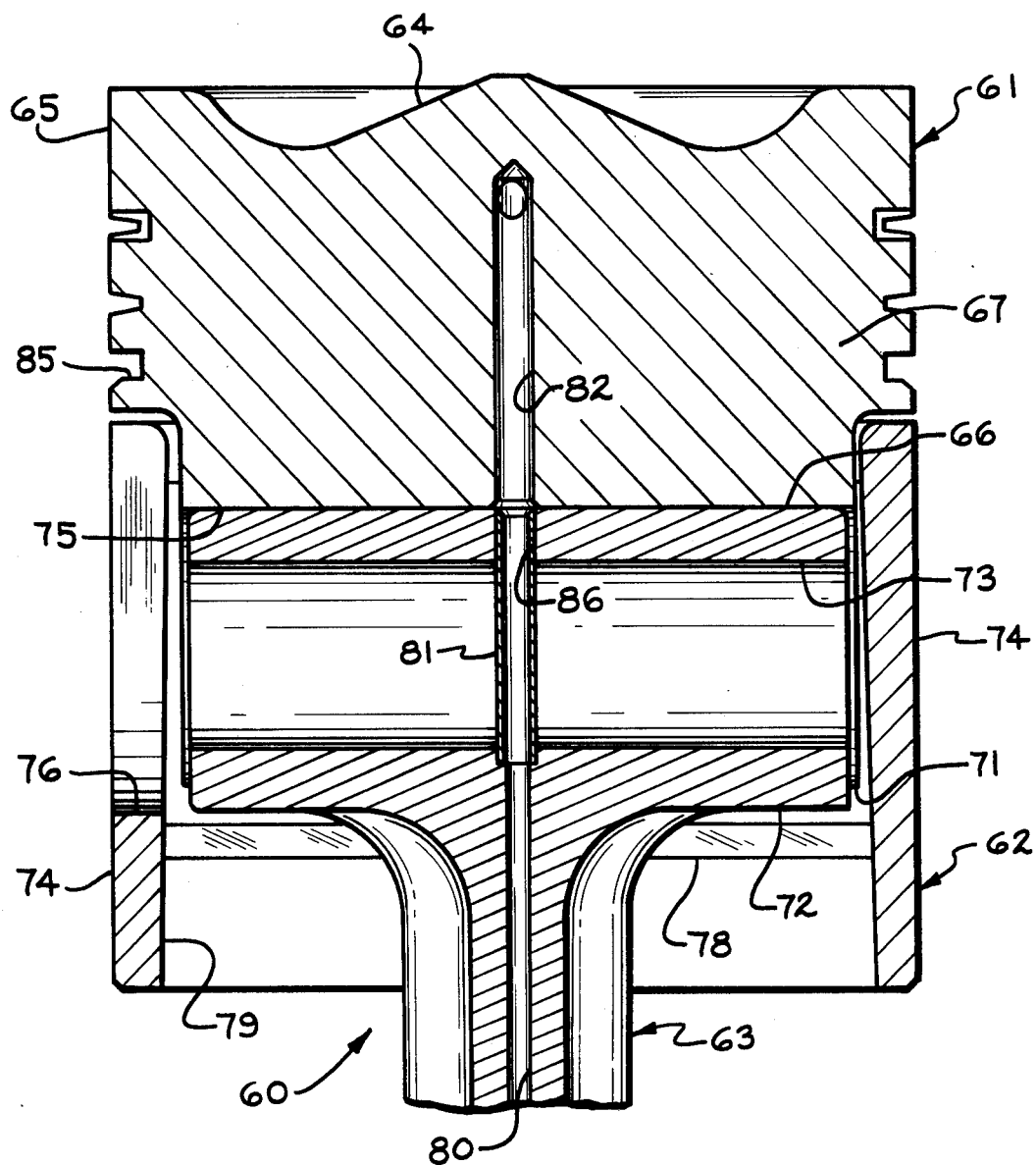
FIG. 6 is a fragmentary vertical cross section of the modified embodiment of a piston assembly and taken at 90° from the cross-sectional view of FIG. 5.

Turning now to FIGS. 5 and 6, a modified embodiment of a piston assembly 60 is shown. The piston assembly 60 includes a piston head 61, a piston skirt 62 and a connecting rod 63 (shown in fragmentary). The piston head 61 is quite similar to the piston head 11 in FIGS. 1-3. The piston head 61 includes a crown 64 which forms a portion of the combustion chamber within an engine, an outer periphery 65 which engages the walls of a cylinder in the engine, and a tubular bearing member 66 which is attached through a web support structure 67 to an inner piston crown 68. The tubular bearing member 66 includes an interior bearing surface 69 for engaging the connecting rod 63 and an exterior journal surface 70 for engaging the skirt 62. The interior and exterior surfaces 69 and 70 terminate at lower edges 71 which define a slot extending the entire length of the bearing member 66.

Unlike the earlier described embodiment, the connecting rod 63 is cast from a single piece of metal with an integral wrist pin type bearing 72. The bearing 72 is generally cylindrical-shaped having a horizontal axis and preferably has an interior opening 73 to reduce the weight of the connecting rod 63. The bearing 72 forms a journal which rotates within the interior bearing surface 69 of the piston head bearing member 66.

The skirt 62 is cast as a single piece of metal having an exterior surface 74 adapted to closely engage the side walls of a cylinder within the engine and having an interior bearing surface 75 adapted to engage the exterior journal surface 70 of the piston head bearing member 66. The bearing surface 75 extends substantially across the entire width of the skirt 62 and through an opening 76 to the exterior surface 74. The opening 76 is of a size and shape to pass the bearing member 66 and the web support structure 67 of the piston head 61. Reinforcing webbing 77 is also provided between an interior wall portion 78 of the piston skirt 62 which defines the bearing surface 75 and an exterior wall portion 79 which defines the exterior surface 74. The webbing 77 prevents flexing of the interior wall portion 78 under extreme side thrust loads.

Oil passages are provided within the piston assembly 60 for cooling the piston head 61. Oil is pumped through a passage 80 in the connecting rod 63 and a tube 81 to a passage 82 and a pair of passages 83 where it is sprayed into the region defined by the interior piston crown 68 and the webbing 67. A portion of the oil sprayed from the passages 83 passes through passages 84 and into a groove 85 which carries an oil ring (not shown) for lubricating the side walls of the cylinder in which the piston assembly 60 is moved. The remainder of the oil flows down through the piston skirt 62 and back to a sump in the engine.

The piston assembly 60 is assembled by initially placing the tube 81 within an opening 86 in the connecting rod bearing 72. The connecting rod bearing 72 is then inserted into the bottom of the skirt 62 and centered between the interior skirt bearing surfaces 75. Finally, the tubular bearing member 66 on the piston head 61 is passed through the skirt opening 76 and slid axially into the space defined between the interior skirt bearing surface 75 and the connecting rod bearing 72. This completes the assembly.

Although only two specific embodiments of piston assemblies have been described above, it will be appreciated that various modifications and changes may be made. The primary consideration in making such changes is to provide a large and uniform bearing surface between the piston head and either a wrist pin, or the end of a connecting rod when a wrist pin or bearing is formed as an integral part of the connecting rod, and to provide a strong, uniform bearing surface between the piston head and a separate piston skirt for distributing side thrust forces without bending the wrist pin or connecting rod. Although the piston assembly has been specifically described for use in an internal combustion engine, it will be appreciated that the piston assembly may be used in other expansion chamber devices such as high pressure compressors.

What I claim is:

1. A piston assembly comprising, in combination, a connecting rod, an elongated cylindrical wrist pin attached to an end of said connecting rod, said wrist pin having an external journal surface, a piston head having an upper surface for forming one wall of an expansion chamber and having a bearing member extending substantially across a lower surface, said bearing member having an interior bearing surface engaging the journal surface of said wrist pin substantially along its entire length and having an exterior journal surface concentric with said interior bearing surface, said bearing member and said wrist pin cooperating to permit rotation between said connecting rod and said piston head, a piston skirt, and thrust bearing means attaching said skirt to said external journal surface of said bearing member for rotational movement between said piston head and said piston skirt.

2. A piston assembly, as set forth in claim 1, wherein said wrist pin is formed integrally with said connecting rod and wherein said thrust bearing means is formed integrally with said piston skirt.

3. A piston assembly, as set forth in claim 1, wherein said thrust bearing means engages sides of said external journal surface along a substantial portion of its length.

4. A piston assembly, as set forth in claim 3, wherein said piston skirt comprises a tube having an interior surface of a diameter for receiving said bearing member, said interior surface having an enlarged diameter annular groove formed therein, and wherein said thrust bearing means comprises two thrust bearing inserts each having a first bearing surface which engages a side of said external journal surface of said bearing member along a substantial portion of its length and having a second surface which engages said annular groove in said skirt interior surface, said bearing member having a limited rotational movement within said thrust bearing inserts, and means for retaining said thrust bearing inserts within said annular groove.

* * * * *